Patented Aug. 26, 1952

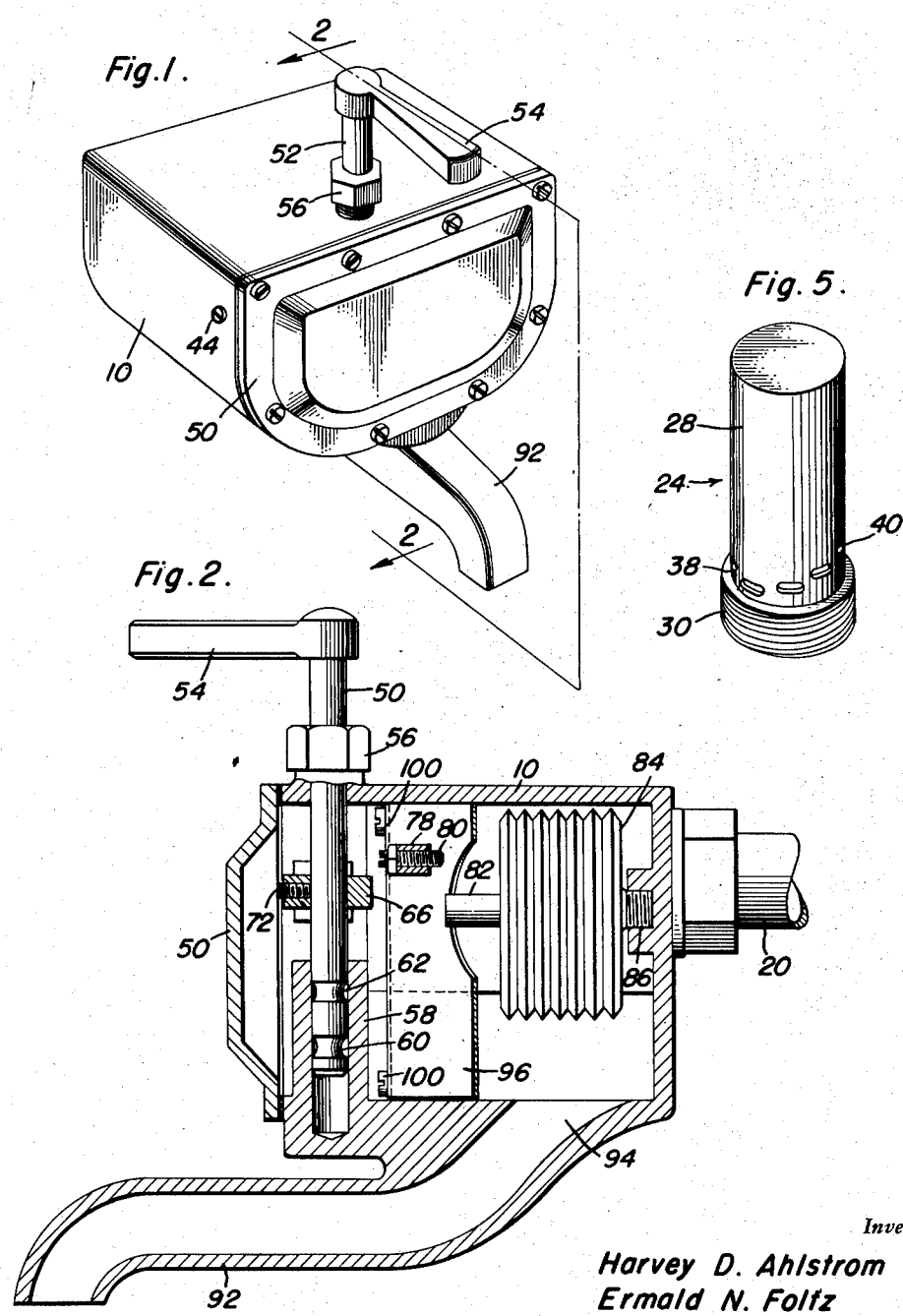

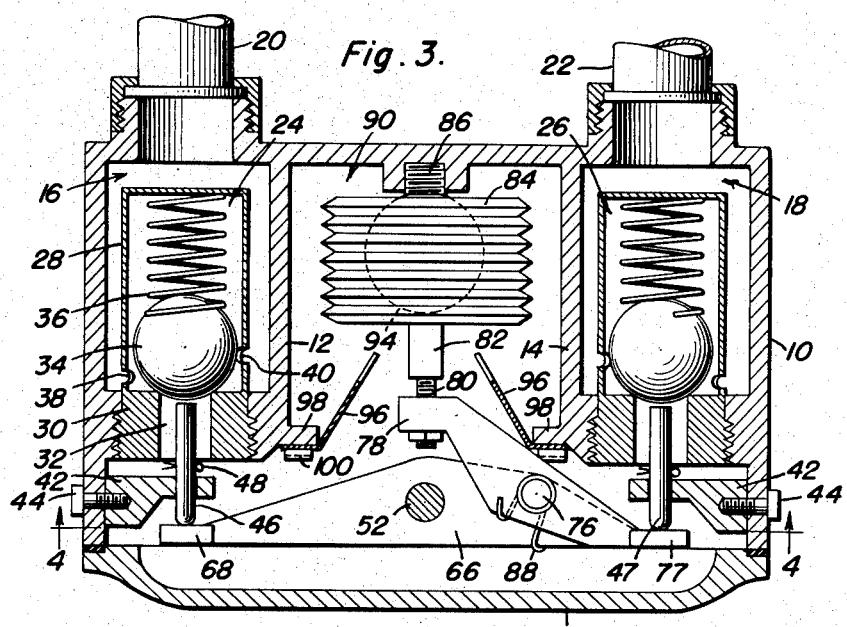
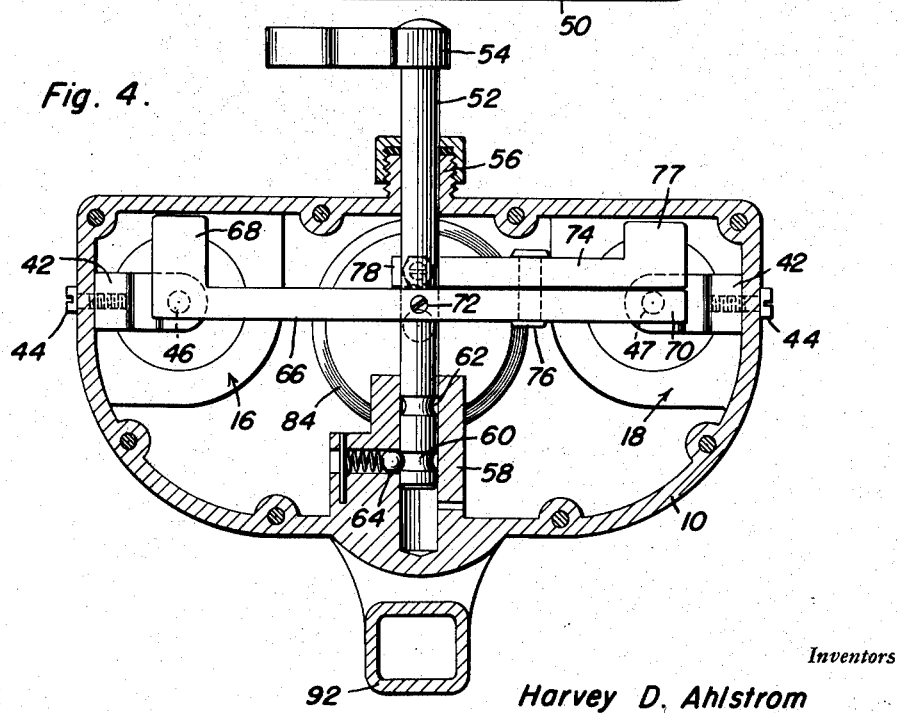

2,608,350

UNITED STATES PATENT OFFICE 2,608,350

MIXING VALVE

Harvey D. Ahlstrom and Ermald N. Foltz, Minocqua, Wis.

Application March 14, 1949, Serial No. 81,377

4 Claims. (Cl. 236—12)

The present invention relates to a new and useful improvement in valves and more particularly to a mixing valve assembly which can be adjusted for manual or thermostatic control.

A primary object of this invention is to provide a mixing valve which may be manually set for the thermostatic control of the temperature of water flowing therethrough, the temperature of the water being adjusted by rotating the operating handle of the mixing valve, while this operating handle may be moved axially of its shaft so that the thermostatic control means is inoperative and rotation of the handle will then control the temperature of the liquid flowing from the mixing valve without reference to the thermostatic control means.

Another object of this invention is to provide a mixing valve wherein easy access is provided to the different elements of the mixing valve, thus facilitating adjustment and repair of the valve when necessary.

Yet another object is to provide a mixing valve with a pair of similar individual valve assemblies which are interchangeable and easily replaceable in hot and cold liquid inlet chambers within the mixing valve casing.

And a last object to be mentioned specifically is to provide a mixing valve assembly in which the individual elements are each relatively simple and inexpensive to manufacture, the mixing valve being safe and convenient to operate under varying conditions and generally adapted for efficient and durable service.

With these objects definitely in view, this invention resides in certain novel features of construction, combination and arrangements of elements and portions, as will be hereinafter described in detail in the specification, particularly pointed out in the appended claims, and illustrated in the accompanying drawings which form a material part of this application, and in which:

Figure 1 is a three dimensional view of the assembled mixing valve;

Figure 2 is a vertical sectional view, taken substantially upon the section line 2—2 in Figure 1;

Figure 3 is a horizontal sectional view;

Figure 4 is a vertical sectional view taken substantially on the section line 4—4 in Figure 3; and, Figure 5 is a three dimensional view of one of the above mentioned individual valve assemblies.

Similar characters of reference designate similar or identical elements and portions throughout the specification and throughout the several views in the drawings.

Referring now to the drawings in detail, this mixing valve includes a casing having inner walls 12 and 14 defining a hot liquid inlet chamber 16 and a cold liquid inlet chamber 18 oppositely and laterally disposed within the casing 10, these chambers being ordinarily connected to a hot water inlet pipe 20 and a cold water inlet pipe 22.

Individual valve assemblies 24 and 26, of identical design, each comprise a hollow elongated member 28 having a slightly enlarged threaded terminal 30 which is screwed into an internally threaded portion provided in each of the walls 12 and 14, so that the individual valve assemblies will extend longitudinally of the chamber 16 or 18 as the case may be. The threaded terminal 30 is centrally apertured as indicated at 32 and a ball 34 seats on the inner end of the threaded terminal 30 so as to close the aperture 32 when the ball is moved into one position by a coiled spring 36 compressed between the ball and the closed end of the elongated member 28 remote from the aperture 32. Stated otherwise, the threaded terminal 30 includes a valve seat for the ball valve 34. A plurality of apertures 38 are provided in the side walls of the member 28 adjacent to the ball 34, certain of these apertures, as indicated at 40, being spaced longitudinally of the members so that fluid entering said member 28 through the apertures 38 and 40 will be directed onto portions of the ball 34 spaced differently from different apertures to cause a swirling flow and rotation of the ball thus preventing undue wear of the ball at any one point thereon and greatly increasing the useful life of the ball.

A pair of pedestals 42 are secured to the casing 10, these pedestals being removably mounted in the casing by screws 44 and being apertured and positioned to support a pair of pins 46 and 47 axially of the apertures 32 in each of the threaded terminals 30. The pins 46 and 47 are actuating pins for the balls 34, and cotter pins 48 or the like may be used to limit the movement of these actuating pins relative to the pedestal 42. In this connection, it may be noted that the casing 10 is provided with a removable front cover plate 50, facilitating access to the interior of the casing so that assembly of the mixing valve, as well as repair and adjustment thereof, is easily accomplished. An actuating shaft 52 carrying a handle 54 is rotatably mounted on the casing 10 as indicated at 56 and 58, the latter reference numeral identifying a centrally bored boss integrally formed interiorly of the casing to receive the inner end of the actuating shaft 50. The actuating shaft has a pair of annular grooves 60 and 62 spaced longitudinally on the shaft and on the portion thereof within the bored boss 58, and if reference can now be had to Figure 4, it will be noted that a spring biased ball 64 is mounted in the side of the bar 58 so as to retain the actuating shaft 52 in either of two positions into which the same may be manually shifted.

The rocker arm 66, having an enlarged terminal 68 adapted to engage the outer end of the pin 46 and another terminal portion 70 adapted to engage the pin 47 when the actuating shaft and rocker arm assembly is in a raised position indicated in Figure 4, is rigidly secured to the actuating shaft 52 by a set screw 72. A lever 74 of a length substantially one half the length of the rocker arm 66 is pivoted on the rocker arm is indicated at 76. One end of the lever 74 has an enlarged terminal 77 and the other end 78 of the lever is bored and threaded to receive an adjusting screw 80 which engages the moving terminal 82 of a wafer thermostat 84 mounted centrally of the casing 10 between the chambers 16 and 18, as by a threaded terminal 86, when the actuating shaft 52 is depressed and held in a position with the ball 64 engaging the annular groove 62, that is, when the device is adjusted for control by the thermostat 84. It will be noted that when the rocker arm assembly is depressed into this position the outer end portion of the terminal 68 of the rocker arm 66 and the terminal 77 of the lever 74 will be in engagement with the pins 46 and 47, respectively. In this connection, it may be noted that the lever 74 is spring biased into one position relative to the rocker arm 66 by a spring 88 operatively associated with the pivot pin 76 and terminally looped over the lever and the rocker arm.

The mixing chamber 90, in which the wafer thermostat 84 is positioned, communicates with an outlet tube 92 formed integrally with the casing 10 and it should be carefully noted that the inner end of the outlet tube 92 is preferably located immediately beneath the thermostat 84, as indicated at 94. A pair of similar baffles 96 are rigidly secured to flanges 98 on the walls 12 and 14 of the casing, by screws 100, these baffles being positioned and dimensioned to direct flow of water from the individual valve apertures 32 onto a central portion of the thermostat 84 so that a more sensitive control of the temperature of the water flowing through the mixing valve is attained.

The operation of this invention will be clearly understood from a consideration of the foregoing description of the mechanical details thereof, taken in connection with the drawings and with the above recited objects of this invention. Further description would appear unnecessary. Minor variations of the embodiment described may be resorted to within the spirit of this invention, the scope of which should be determined by the subjoined claims.

Having described the invention, what is claimed as new is:

1. A mixing valve assembly comprising a casing having hot and cold liquid inlet chambers, a valve in each inlet chamber, an operating shaft mounted in said casing for rotative and axial movement, a rocker arm rigidly fixed on said shaft for rocking motion about the shaft as axis for simultaneous and opposite operation of said valves when the shaft has been shifted axially into one position, a liquid outlet in said casing, a lever carried by said rocker arm and having its fulcrum on said rocker, said lever having one end operatively connected to one of said valves when the shaft has been shifted axially into a second position, and temperature responsive actuating means operatively associated with the other end of said lever when the shaft is in said second position to the exclusive of the operative connection of said rocker arm with said one valve, said temperature responsive means being positioned to respond to changes of temperature in liquid admitted to said casing through said valves, rotative shifting of said shaft and rocker arm shifting the fulcrum of the lever relative to its points of operative contacts with said one of the valves and said temperature responsive means.

2. A mixing valve assembly comprising a casing having hot and cold liquid inlet chambers, a valve in each inlet chamber, an operating shaft mounted in said casing for rotative and axial movement, a rocker arm rigidly fixed on said shaft for rocking motion about the shaft as axis for simultaneous and opposite operation of said valves when the shaft has been shifted axially into one position, a liquid outlet in said casing, a lever carried by said rocker arm and having its fulcrum on said rocker, said lever having one end operatively connected to one of said valves when the shaft has been shifted axially into a second position, and temperature responsive actuating means operatively associated with the other end of said lever when the shaft is in said second position to the exclusion of the operative connection of said rocker arm with said one valve, said temperature responsive means being positioned to respond to changes of temperature in liquid admitted to said casing through said valves, rotative shifting of said shaft and rocker arm shifting the fulcrum of the lever relative to its points of operative contact with said one of the valves and said temperature responsive means, said casing having a mixing chamber, said temperature responsive means comprising a wafer thermostat in said mixing chamber, and a baffle to direct said liquid entering said chamber onto a central portion of said thermostat.

3. A mixing valve assembly comprising a casing having hot and cold liquid inlet chambers, a valve in each inlet chamber, an operating shaft mounted in said casing for rotative and axial movement, a rocker arm rigidly fixed on said shaft for rocking motion about the shaft as axis for simultaneous and opposite operation of said valves when the shaft has been shifted axially into one position, a liquid outlet in said casing, a lever having its fulcrum on said rocker arm and one end operatively connected to one of said valves when the shaft has been shifted axially into a second position, and temperature responsive actuating means operatively associated with said other end of said lever when the shaft is in said second position to the exclusion of the operative connection of said rocker arm with said one valve, said temperature responsive means being positioned to respond to changes of temperature in liquid admitted to said casing through said valves, rotative shifting of said shaft and rocker arm shifting the fulcrum of the lever relative to its points of operative contact with said one of the valves and said temperature responsive means, said fulcrum comprising a pivot pin, and the axes of said pivot pin and said shaft being parallel.

4. A mixing valve assembly comprising a casing having hot and cold liquid inlet chambers, a valve in each inlet chamber, an operating shaft mounted in said casing for rotative and axial movement, a rocker arm rigidly fixed on said shaft for rocking motion about the shaft as axis for simultaneous and opposite operation of said valves when the shaft has been shifted axially into one position, a liquid outlet in said casing, a lever having its fulcrum on said rocker arm and one end operatively connected to one of said valves when the shaft has been shifted axially into a second position, a temperature responsive actuating means operatively associated with the other end of said lever when the shaft is in said second position to the exclusion of the operative connection of said rocker arm with said one valve, said temperature responsive means being positioned to respond to changes of temperature in liquid admitted to said casing through said valves, rotative shifting of said shaft and rocker arm shifting the fulcrum of the lever relative to its points of operative contact with said one of the valves and said temperature responsive means, said valves each comprising a hollow elongated member with apertures in the side walls thereof and having one end closed, a valve seat in the other end of the member, a ball valve on said seat, a spring compressed between said closed end and said ball valve, and an actuating pin for said ball valve extending through said seat and axially shiftably mounted so that one end of the pin is engaged by said one end of the lever, in the case of one of said valves, and by said rocker arm in the case of the other valve, the other end of the pin engaging the corresponding ball valve.

HARVEY D. AHLSTROM.
ERMALD N. FOLTZ.

REFERENCES CITED

The following references are of record in the file of this patent:

UNITED STATES PATENTS

| Number | Name | Date |
|---|---|---|
| 1,024,729 | Lawler | Apr. 30, 1912 |
| 1,083,015 | Holzhausen | Dec. 30, 1913 |
| 1,183,599 | Sparks | May 16, 1916 |
| 1,574,537 | Burch | Feb. 23, 1926 |
| 1,787,215 | Sinclair | Dec. 30, 1930 |
| 2,417,158 | Fraser | Mar. 11, 1947 |
| 2,430,133 | Muffly | Nov. 4, 1947 |